Patented Sept. 8, 1936

2,053,728

UNITED STATES PATENT OFFICE 2,053,728

SURGICAL BANDAGE

Karl Mienes, Charlottenburg, Germany

No Drawing. Application August 3, 1931, Serial No. 554,957. In Germany August 6, 1930

4 Claims. (Cl. 128—91)

This invention relates to a process for the production of hard and elastic masses, especially gypsum bandages.

It is known to utilize the property possessed by calcined gypsum, of forming solid, hard masses, due to the formation of hydrate, when wetted with water, both for the production of gypsum articles, castings and mouldings of convenient shape, and for taking casts of parts of the body, making supports for the body and for making gypsum bandages. These bandages are very extensively used in surgery, orthopaedy and dermatology, but they have the disadvantage of excessive hardness and insufficient elasticity, owing to the fact that the bandages—which, except for the supporting layer of fabric, consist of pure gypsum—harden to a rigid mass resembling stone. Moreover the ordinary gypsum bandages have the defect that the powdered gypsum adheres imperfectly to the fabric and that the plaster partly drops away in the course of rolling the bandages, and especially on immersing the same in water and that, owing to the insufficient absorption of water by the dry gypsum powder, the bandages must be left for a comparatively long time, i. e. for some minutes, to soak; in fact hot water or alum water is required in order to accelerate hardening. Since allowance must be made for a considerable loss of the powdered gypsum, through becoming detached from the bandage during these preliminary operations, a large excess of gypsum has to be used in making the plaster of Paris dressings with the result that such dressings and especially bandagings, supporting corsets, splints and the like produced therefrom, are excessively heavy. Many and various attempts have been made to remedy the foregoing disadvantages, for example, by affixing the gypsum on to the fabric with solutions of shellac, asphaltum, elemi or other resins, or by soaking the fabric in solutions of glue and spreading the gypsum on to the solidifying layer of glue, or again by stirring the gypsum powder into a solution of gelatine in acetic acid and applying the mixture to the bandage fabric. None of these methods has however proved successful, and, in particular, the coatings of gelatine or glue have still further increased the hardening of the bandage and prevented the gypsum from absorbing a sufficiency of water.

It has now been ascertained that gypsum bandages of exceptional pliability, which are very readily moistened even by immersion in cold water for a few seconds, and which set, in a few minutes to a hard, but nevertheless somewhat elastic mass, can be produced by fixing the gypsum powder on to the bandage fabric with the aid of a cellulose derivative binder dissolved in an anhydrous solvent, which binder possesses the property of dissolving, not only in the anhydrous solvent, but also in water, or at least of swelling up quickly by absorbing water.

In carrying out the process of the present invention, the cellulose derivative binder is dissolved in an anhydrous solvent, such as a hydrocarbon, a chlorinated hydrocarbon, an ether or ester of low boiling point, a terpene or the like or in an alcohol, ketone or like solvents, which may contain small quantities of water, this latter, in such case, having to be rendered harmless by the employment of a slightly larger amount of gypsum. The gypsum powder is triturated, with said solution, to form a paste, which is spread on a gauze bandage or similar fabric.

Solvents of low boiling point, namely below 100° C., are preferably employed, in order that the gypsum bandages can be dried in the air without the application of strong heat. Directly the solvent has evaporated, the bandages are ready for use and will keep for any length of time, because the cellulose derivative binder not only fixes the powder on to the fabric foundation, but also protects it, to a considerable degree, from absorbing water from the moisture in the air. It is not absolutely necessary that the binder should dissolve completely in the organic solvent used, all that is needed being that it is able to swell up considerably therein, or that if it dissolves only when the solvent is warm, it solidify to a paste in the cold solvent since the gypsum powder can also be stirred or kneaded into the swollen or pasty products, and be applied to the fabric in that condition.

Inasmuch as the nature and amount of the cellulose derivative binder can be varied at convenience, thus modifying the ratio between gypsum and binding medium and moreover inasmuch as plasticizing substances, such as glycerine, acetine, fats, oils and the like can be added to the binding media, the flexibility and elasticity of the gypsum bandages can be varied over a wide range.

This is a point of special importance and constitutes a considerable improvement in connection with the production of large body bandagings, especially for supporting corsets and prostheses, in which connection, moreover, it is an important fact that the completed dressings produced in accordance with the invention need to be only half as heavy, for a given strength, as ordinary plaster of Paris bandages.

The elasticity and resistance to breakage of these gypsum masses is also an important advantage in the production of castings and mouldings entailing the employment of gypsum powder which was previously mixed with an anhydrous adhesive solution and then retransformed into a dry powder by evaporating the solvent. The castings or mouldings produced from this powder in the usual manner, with addition of water have a far higher resistance to breakage and are far less fragile or brittle than the usual gypsum figures or mouldings.

This strength, which can be increased, if necessary, by an after treatment with hardening agents or water-proofing substances, naturally enables substantially smaller amounts of gypsum to be used, or the thickness of the material and therefore the weight of the finished dressing to be reduced.

Suitable binding media which may be employed in carrying out the invention comprise all such cellulose derivatives such as esters or ethers as are not only soluble in anhydrous, or nearly anhydrous, solvents, or are adapted to swell up in such solvents to a pasty and easily workable mass, but are also adapted to dissolve or swell up in water.

Such binding media comprise, for example, cellulose esters, such as extensively hydrolyzed acetylcellulose dissolved in an alcoholic solution of calcium chloride, cellulose ethers soluble in or swelling up in water, and dissolved in ethylformate such as, for example, viscose monoethyl ether, cellulose sulphacetate, or the like.

*Example I*

100 grams of freshly precipitated cellulose sulphacetate are dissolved in 700 grams of alcohol and 200 grams of acetone, 50 grams of monoacetine being added and 2,000 grams of gypsum then stirred into the mass. The viscous paste is diluted with another 500 grams of alcohol, and then spread out thinly, with a spatula, on a muslin strip. After drying, which can be accelerated by ventilation and a current of warm air, the bandage forms a uniformly smooth layer, with a compact surface, on which the gypsum adheres so firmly that it neither drops off nor crumbles away when the bandage is rolled or moved, or when immersed in water. On being wetted with water, the bandage softens in a few seconds, whereupon it is freed from surplus water by squeezing and used for the purpose of making plaster of Paris dressings. It sets in a few minutes and attains its final degree of hardness in 5 to 10 minutes longer.

In order to reduce the time required for setting, the dissolved binding medium, or the gypsum can be treated with an addition of hardening agents, such as alum, in the form of powder, which agents are not activated until water is added. Other substances which set in association with water, such as cement-, zinc oxychloride-, magnesium oxychloride, and like masses, may also be added to, or employed in place of, the gypsum.

The term "gypsum" employed herein is intended to denote either natural or purified calcium sulphate or exsiccated calcium sulphate, such as plaster of Paris.

I claim:—

1. A flexible surgical and orthopaedic bandage comprising a layer of a film-forming cellulose derivative selected from a group consisting of cellulose ester and cellulose ether capable of dispersing in volatile organic solvents and adapted to be permeated by water, the said layer including calcined gypsum convertible into hydrated gypsum upon moistening the bandage, and particles of the said calcined gypsum in the layer being readily accessible to water employed to moisten the bandage and permeating through the layer of cellulose derivative, from which moistening the setting of the calcined gypsum in the layer results.

2. A flexible surgical and orthopaedic bandage comprising a layer of a film-forming cellulose ester capable of dispersing in volatile organic solvents and adapted to be permeated by water, the said layer including calcined gypsum convertible into hydrated gypsum upon moistening the bandage, and particles of the said calcined gypsum in the layer being readily accessible to water employed to moisten the bandage and permeating through the layer of cellulose ester, from which moistening the setting of the calcined gypsum in the layer results.

3. A flexible surgical and orthopaedic bandage comprising a layer of a film-forming cellulose ether capable of dispersing in volatile organic solvents and adapted to be permeated by water, the said layer including calcined gypsum convertible into hydrated gypsum upon moistening the bandage, and particles of the said calcined gypsum in the layer being readily accessible to water employed to moisten the bandage and permeating through the layer of cellulose ether, from which moistening the setting of the calcined gypsum in the layer results.

4. A flexible surgical and orthopaedic bandage comprising a base of textile material and an adherent layer of a film-forming cellulose derivative selected from a group consisting of cellulose ester and cellulose ether capable of dispersing in volatile organic solvents and adapted to be permeated by water, the said layer including calcined gypsum convertible into hydrated gypsum upon moistening the bandage, and particles of the said calcined gypsum in the layer being readily accessible to water employed to moisten the bandage and permeating through the layer of cellulose derivative, from which moistening the setting of the calcined gypsum in the layer results.

KARL MIENES.